Sept. 20, 1971  A. A. WAGNER  3,606,408
COUPLING DEVICE FOR TUBULAR MEMBERS
Filed April 1, 1969
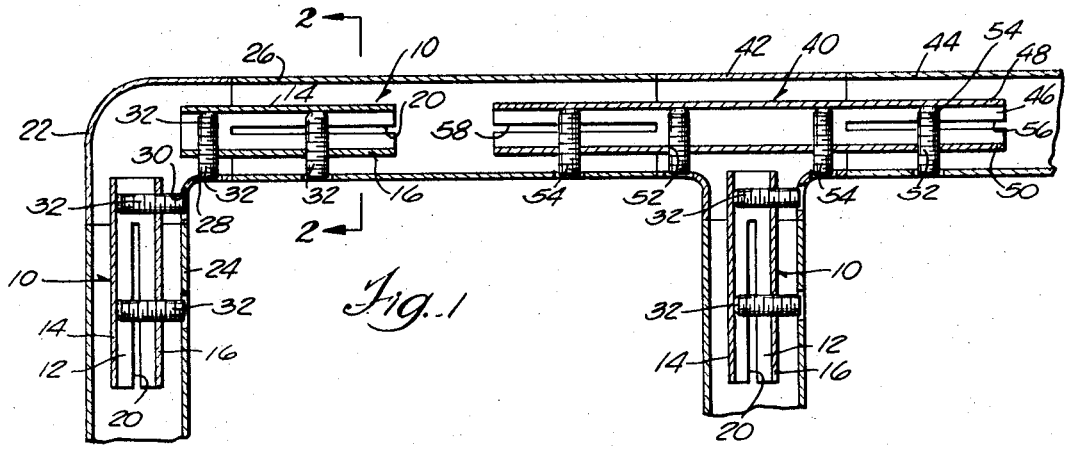
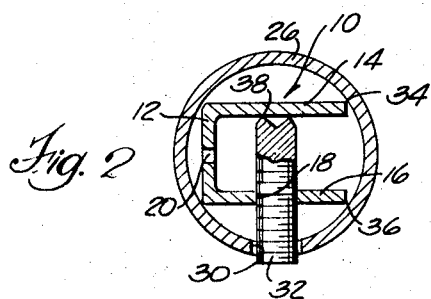
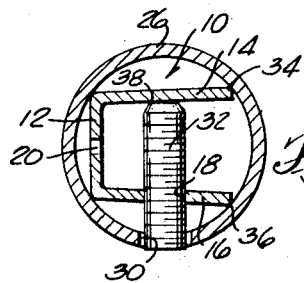
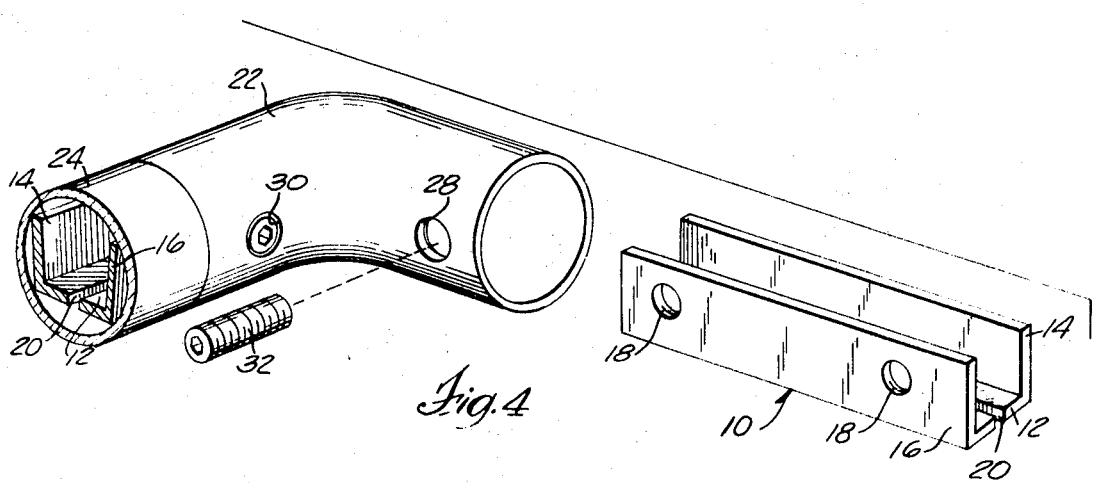
Inventor
Adolph A. Wagner
By
Paul R. Puerner
Attorney

# United States Patent Office 3,606,408
Patented Sept. 20, 1971

3,606,408
COUPLING DEVICE FOR TUBULAR MEMBERS
Adolph A. Wagner, 3454 N. Shepard Ave.,
Milwaukee, Wis. 53211
Filed Apr. 1, 1969, Ser. No. 812,048
Int. Cl. E04g 7/00
U.S. Cl. 287—54                              1 Claim

ABSTRACT OF THE DISCLOSURE

A connector for coupling a pair of tubular members in end-to-end relationship comprising a connector member of elongated channel shape having a base portion and a pair of leg portions adapted for insertion into the open ends of the tubular members. A plurality of set screws are threaded through threaded openings in one leg of the connector member for tightening into engagement with the inside face of the other member to thereby cause the leg portions to be expanded into tight gripping engagement with the inside surface of the tubular members. Access to the set screws is provided by openings in the walls of the tubular members. The base portion of the connector member is provided with a longitudinally extending slot to thereby weaken the base portion to facilitate expansion of the leg portions.

BACKGROUND OF INVENTION

(I) Field of invention

This invention relates to an improved device for securely coupling a pair of tubular members in end-to-end relationship.

(II) Description of prior art

There have been a number of devices previously developed for coupling tubular members together, the most pertinent known to applicant are disclosed in U.S. Pat. Nos. 2,290,430, 2,645,509, 2,850,304 and 2,997,317. Compared with the prior art referred to above, the present connector is of simplified design requiring a fewer number of parts to provide a lower cost and easy installation.

SUMMARY OF INVENTION

A connector for coupling a pair of tubular members in end-to-end relationship comprising a connector member of elongated channel shape comprising a base portion and a pair of integral leg portions adapted for insertion into the open ends of the tubular members. An expansion means is provided for causing said leg portions to be expanded into tight gripping engagement with the inside surface of the tubular members and the base portion of the channel member is weakened to facilitate expansion of the leg portions.

DESCRIPTION OF DRAWINGS

FIG. 1 is a fragmentary sectional plan view of a typical pipe railing structure showing two embodiments of the invention;

FIG. 2 is a sectional view taken along line 2—2 of FIG. 1 showing the expansion connector in its unexpanded position;

FIG. 3 is a view similar to FIG. 2, but showing the expansion connector in its expanded position; and FIG. 4 is a partially exploded perspective view illustrating one embodiment of the invention.

DESCRIPTION OF PREFERRED EMBODIMENT

While this invention is particularly designed for use in the fabrication of pipe railing structures it could be used to advantage wherever it was desired to connect a pair of hollow members together.

Referring now to the drawings in detail, FIG. 1 shows a sectional view of some typical joints wherein an expansion connector of this invention may be employed.

As most clearly shown in FIG. 4, the expansion connector 10 is of one-piece construction of substantially elongated channel shape comprising a base portion 12 and a pair of leg portions 14 and 16. Leg portion 16 is provided with a pair of threaded openings 18 the function of which will be explained in detail hereinafter. It is also noted that the base portion 12 of the connector is weakened by a slot 20 for a reason which will be fully explained hereinafter.

As clearly shown in FIG. 2, connector 10 is dimensioned so that it can be inserted end-wise into a standard size tube when such connector is in its unexpanded condition. As shown in FIG. 1 the connector 10 can be used in connecting several different types of tubular fittings. For example, in the left-hand portion of FIG. 1 two connectors 10 are shown making a coupling between a 90° elbow 22 and straight tubular members 24 and 26.

Referring to the joint between elbow 22 and tube 26, the first step in making the joint is to position the unexpanded connector 10 so that one end portion thereof is inside tube 26 and the other end is inside elbow 22. Elbow 22 and tube 26 are provided with openings 28 and 30 respectively which are brought into alignment with threaded openings 18 in the connector. The next step is to thread set screws 32 into threaded openings 18 of the connector. Screws 32 of course will extend through openings 28 and 30 in the elbow 22 and tube 26. It should be noted at this point that for ease of installation the connector 10 and one set screw 32 should be installed loosely in either the elbow or the tube before the mating fitting (elbow or tube) is slipped over the other end of the connector. With one screw installed, it will be much easier to align the parts for proper installation of the second screw.

With the screws installed as shown in FIG. 2, the edges 34, 36 of legs 14 and 16 of the connector will be spaced slightly from the inside surface of elbow 22 and tube 26. To complete the joint, screws 32 are tightened further to the position shown in FIG. 3. Such tightening of the set screws 32 will cause the tips 38 of the screws to bear against the inside face of leg 14 which in turn will cause legs 26 and 14 to be expanded into tight gripping engagement with the inside surface of elbow 22 and tube 26. The sharp edges 34 and 36 on such legs will tend to dig into the mating parts to thereby provide a strong joint therebetween.

As indicated previously, base portion 12 of connector 10 is provided with a slot 20. Slot 20 serves to somewhat weaken the base portion 12 to thereby facilitate the outward expansion of the legs 14 and 16 when the set screws 32 are tightened into threaded openings 18. In other words, the central portion of base 12 weakened by slot 20 serves as a kind of a hinge about which the connector legs can be expanded outwardly into locking engagement with the tubular members. It should be understood that while the use of a slot 20 is the preferred arrangement for weakening base 12 other ways could be used such as, for example, a series of spaced holes.

A second embodiment of the invention is shown on the right-hand side of FIG. 1 wherein an elongated connector 40 is used to connect tube 26, T fitting 42 and tube 44. Connector 40 is similar in construction to connector 10 comprising a base portion 46 and a pair of leg portions 48 and 50. The leg 50 of the connector is provided with four (4) threaded openings 52 for installation of four (4) set screws 54 as shown. The base portion 46 is provided with a pair of aligned slots 56 and 58 to provide the desired weakening action referred to previously. The operation of connector 40 is essentially the same as connector 10.

Although this invention has been illustrated and described in connection with particular embodiments thereof, it will be apparent to those skilled in the art that various changes and modifications may be made therein without departing from the spirit of the invention or from the scope of the appended claims.

I claim:
1. A connector for coupling a pair of tubular members in end-to-end relationship comprising:
 a one-piece connector member of elongated channel shape comprising a base portion and pair of integral leg portions which define a corner on each side of said base portion and which terminate in outwardly facing edge surfaces, said connector member adapted for insertion into the open ends of the tubular members;
 a plurality of set screws each threaded through a threaded opening in one leg portion for tightening into engagement with the inside face of the other leg portion, said set screws being accessible for tightening thereof through openings in the tubular members to thereby cause said corners and edges of said leg portions to be expanded into tight gripping engagement with the inside surface of the tubular members; and
 means for weakening said base portion of said connector member including a longitudinally extending slot in said base member, said slot extending through one edge of said base member and terminating short of the other end thereof.

References Cited

UNITED STATES PATENTS

| | | | |
|---|---|---|---|
| 1,678,350 | 7/1928 | Ott | 287—54C |
| 2,941,855 | 6/1960 | Weill | 287—54C |

FOREIGN PATENTS

| | | | |
|---|---|---|---|
| 548,983 | 7/1956 | Belgium | 287—2 |
| 1,192,878 | 5/1965 | Germany | 287—2 |
| 744,284 | 1/1956 | Great Britain | 285—397 |
| 965,479 | 7/1964 | Great Britain | 287—2 |

DAVE W. AROLA, Primary Examiner

U.S. Cl. X.R.

285—397; 287—2